United States Patent [19]

Fawley

[11] 4,098,416

[45] Jul. 4, 1978

[54] CARRIER FOR COMPRESSED GAS CYLINDERS

[76] Inventor: Norman C. Fawley, 10460 Hickson St., El Monte, Calif. 91734

[21] Appl. No.: 765,418

[22] Filed: Feb. 3, 1977

[51] Int. Cl.² .............................................. B62B 1/06
[52] U.S. Cl. .................................. 214/380; 280/47.24
[58] Field of Search ........................ 280/47.24, 47.26; 214/380; 220/85 P

[56] References Cited

U.S. PATENT DOCUMENTS

| 1,873,690 | 8/1932 | Ward | 280/47.24 X |
| 2,476,539 | 7/1949 | Fortin | 214/380 |
| 2,739,721 | 3/1956 | Blouin | 214/380 |
| 3,598,420 | 8/1971 | Edlin | 280/47.24 |
| 3,776,412 | 12/1973 | Mink | 220/85 P |

FOREIGN PATENT DOCUMENTS

| 227,962 | 5/1960 | Australia | 280/47.24 |
| 499,785 | 3/1951 | Belgium | 214/380 |

Primary Examiner—Joseph F. Peters, Jr.
Assistant Examiner—R. Schrecengost
Attorney, Agent, or Firm—Lyon & Lyon

[57] ABSTRACT

A carrier for compressed gas cylinders which includes a frame having a pair of wheels at its lower end and a set of hooks at its upper end arranged to suspend compressed gas cylinders; in one embodiment, each hook element is pivotable and arranged to engage an internal flange or cut out forming a part of a one type valve protector for compressed gas cylinders; in a second embodiment, each hook element is fixed and arranged for insertion in an opening provided in another type of valve protector for compressed gas cylinders; both embodiments of hook elements being adapted to suspend the compressed gas cylinders upon tilting the carrier to raise the compressed gas cylinders off the ground so they can be moved easily.

4 Claims, 11 Drawing Figures

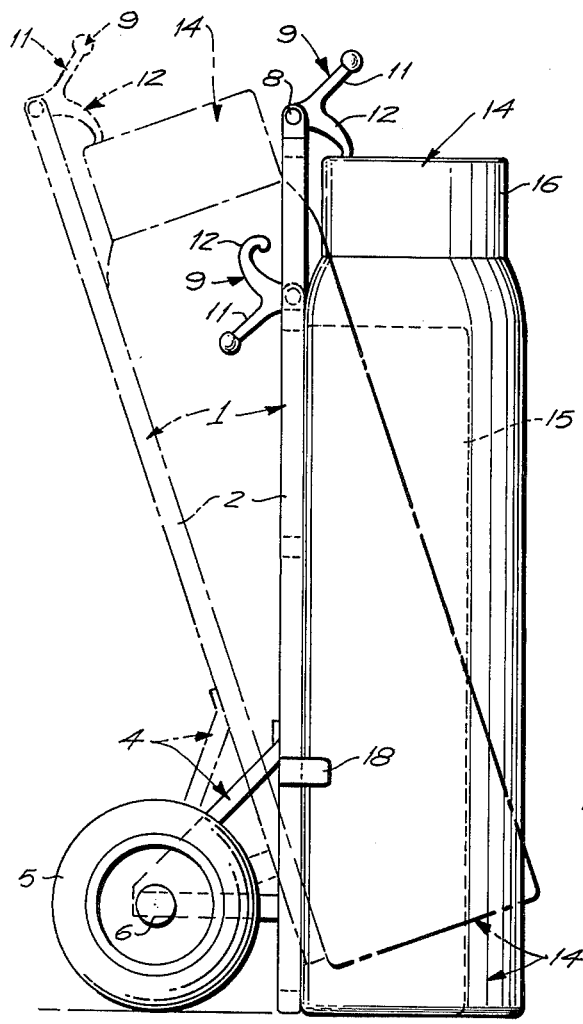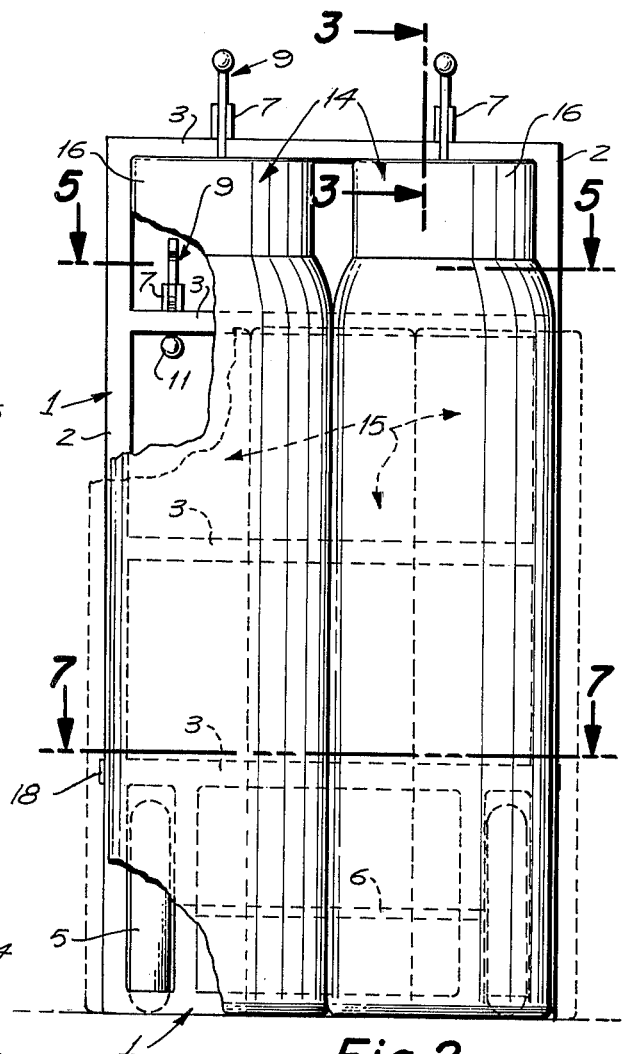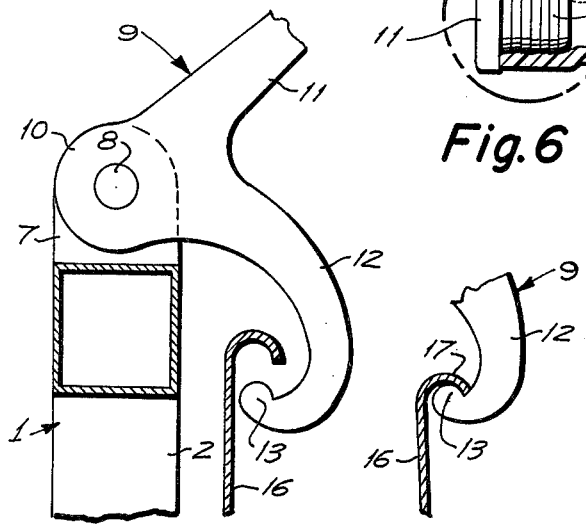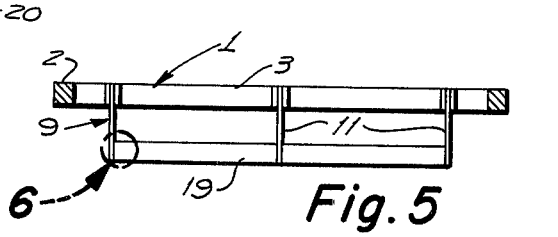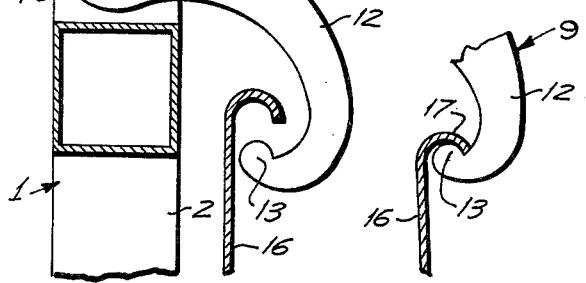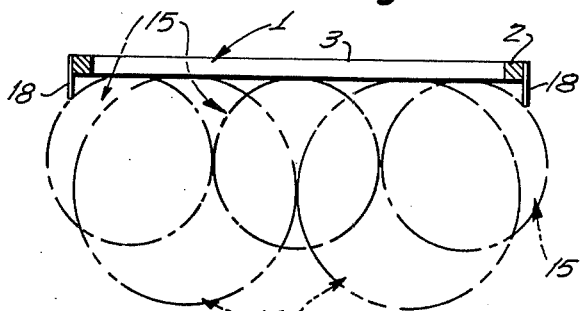

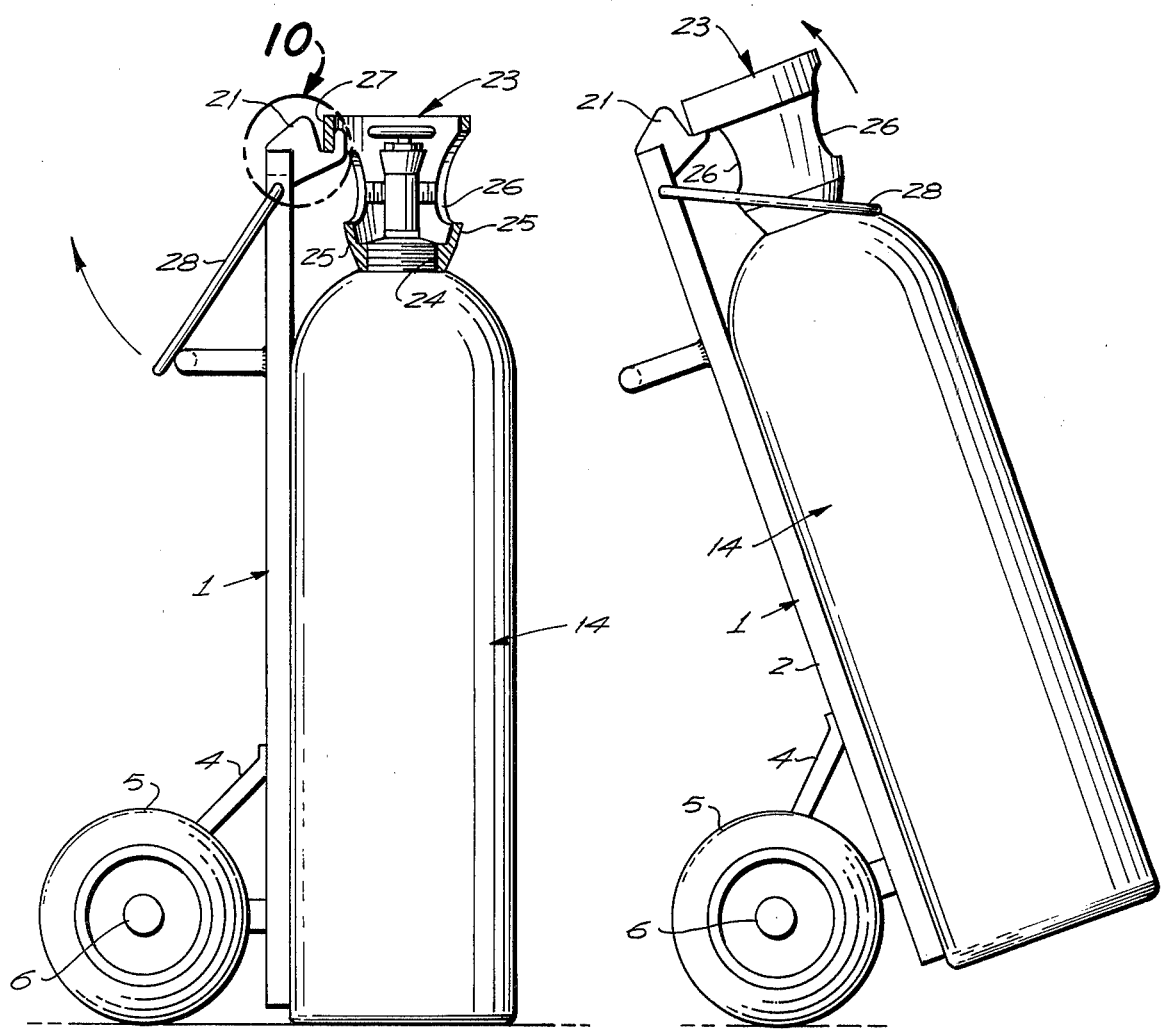
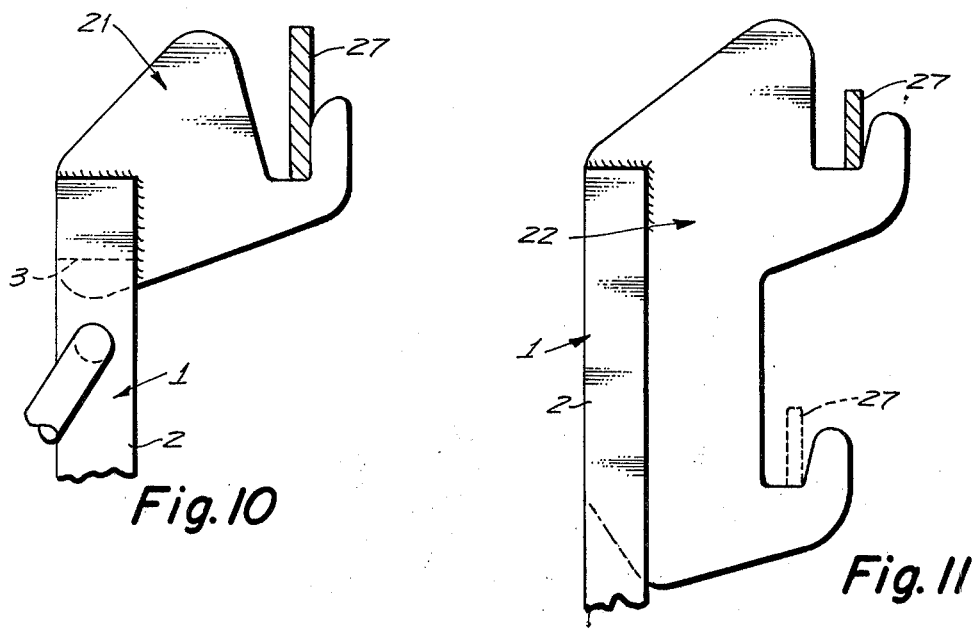

CARRIER FOR COMPRESSED GAS CYLINDERS

BACKGROUND

The traditional method of moving compressed gas cylinders which can weigh up to 300 pounds each has been to manually tilt the cylinder and roll the cylinder about its lower end.

When the cylinder is rolled by hand, the cylinder is loosely held at its upper end by one hand while the operator uses his other hand or foot to roll the cylinder. While manual rolling is fairly easy if the operator is experienced, one can easily cause the cylinder to fall, possibly damaging or breaking off the valve.

An alternative method of moving compressed gas cylinders is to use a conventional hand truck having a supporting plate or foot. When using a conventional hand truck with a supporting plate, it is necessary to tilt the cylinder backwards with one hand while forcing the supporting plate under the cylinder. This is usually done with the operator's foot while steadying the hand truck with his other hand. The hand truck is then tipped backwards and at the same time the cylinder must also be tipped backwards in order to lift the cylinder for transport.

If the operator wishes to transport more than one cylinder at a time, he must balance the first cylinder while manipulating the hand truck and second cylinder. If three cylinders are to be transported, placement of the third cylinder is more complicated with increased danger that one or more cylinders may fall, damaging the cylinder or injuring the operator, both when loading and when transporting the cylinders. To prevent the cylinders from falling during transport, a chain or belt is secured about the hand truck and cylinders.

Another problem inherent with the conventional hand truck and its supporting plate is that it is customary to store the cylinders such as on a loading dock in closely stacked relation in order to save space and provide mutual support between the cylinders; consequently, it is necessary to manually separate each cylinder from the stack in order to place it on the hand truck, or to manipulate each cylinder when moving it from the hand truck back to a stack.

Because of the substantial manual handling of the compressed gas cylinders, which are quite heavy, there is substantial danger of injury to the operator's fingers or hands if the cylinders are forced toward each other when the operator's hands or fingers are between the cylinders. There is also the possibility of injury to the operator's foot or ankle or back from reaching and straining when in an awkward position.

SUMMARY

The present invention is directed to a carrier for compressed gas cylinders which is summarized in the following objects:

First, to provide a carrier for compressed gas cylinders which materially reduces the need for manually handling of the cylinders in order to secure the cylinders to the carrier or separate the cylinders from the carrier even though the cylinders are removed from or returned to a closely stacked group of cylinders.

Second, to provide a carrier as indicated in the preceding object wherein the carrier is provided with wheels at its lower end and novelly arranged hook elements at its upper end engagable with the upper ends of closely stacked cylinders without requiring movement of the cylinders other than tilting the cylinders for engagement by the carrier for transport.

Third, to provide a carrier as indicated in the preceding objects, one embodiment of which is provided with pivotable hook elements arranged for compressed gas cylinders having valve protectors provided with internal flanges or cutouts to suspend the cylinders for transport.

Fourth, to provide a carrier for compressed gas cylinders, another embodiment is provided with fixed hook elements particularly arranged for compressed gas cylinders having valve protectors, such as is disclosed in U.S. Pat. No. 3,776,412, which have perforations into which the fixed hook elements may be inserted by manipulation of the carrier. The hook arrangement, because of the method of attachment and the weight of the cylinders, provides an extremely secure method of transporting compressed gas cylinders.

BRIEF DESCRIPTION OF THE FIGURES

FIG. 1 is a side view of one embodiment of the carrier for compressed gas cylinders indicating by broken line a tilted position of the carrier for suspending a compressed gas cylinder.

FIG. 2 is a front view thereof showing in solid outline a pair of larger compressed gas cylinders and by broken outline a set of three smaller compressed cylinders.

FIG. 3 is an enlarged fragmentary sectional view taken through 3—3 of FIG. 2 showing one of the hook members in position for engaging a compressed gas cylinder.

FIG. 4 is a fragmentary view similar to FIG. 3 showing the hook member as it appears when suspending a compressed gas cylinder.

FIG. 5 is a sectional view taken through 5—5 of FIG. 2 showing a yieldable connection means between a set of the hook members for simultaneous operation thereof.

FIG. 6 is an enlarged fragmentary view taken within circle 6 of FIG. 5.

FIG. 7 is a transverse sectional view taken through 7—7 of FIG. 5 indicating the manner in which a pair of larger cylinders or a set of three smaller cylinders may be retained against lateral displacement.

FIG. 8 is a side view showing another embodiment of the carrier for compressed gas cylinders, the compressed gas cylinder being shown in its vertical position resting on an underlying surface.

FIG. 9 is a similar side view showing the pressure cylinder in its suspended condition.

FIG. 10 is an enlarged view taken within circle 10 of FIG. 8.

FIG. 11 is a view similar to FIG. 10 showing the hook arrangement as arranged to carry alternatively a larger size and a smaller size of the compressed gas cylinder.

DETAILED DESCRIPTION

Referring to FIGS. 1-7, the embodiment here illustrated includes a rectangular frame structure 1 having vertical side bars 2 and cross bars 3. Extending rearwardly from the lower portion of the frame structure is a pair of wheel brackets 4 which support a pair of wheels 5 on a common shaft 6.

Extending upwardly from the upper cross bar of the frame structure is a pair of journal brackets 7 which receive journal pin 8 for pivotably supporting a pair of hook elements 9. Each hook element includes a central portion 10 from which diverge a handle arm 11 and a hook arm 12. Each hook arm 12 terminates in an inturned hook 13.

A second or third cross bar 3, depending on the cylinder's height, is also provided with journal brackets 7; in this case a set of three journal brackets which receive hook element 9. The uppermost pair of hook elements are intended for use with large size compressed gas cylinders 14. The lower set of three hook elements are intended for use in conjunction with smaller compressed gas cylinders 15.

Either size of compressed gas cylinders includes a cylindrical upwardly extending valve guard 16 having at its upper margin inwardly and downwardly curved reinforcing flange 17. The compressed gas cylinders including the valve guards 15 are conventional.

Operation of the carrier is as follows and is the same whether a pair of larger compressed gas cylinders or three smaller compressed gas cylinders are to be transported by the carrier.

In either case, the compressed gas cylinders prior to engagement occupy a vertical position and may be in mutual contact. The frame structure when in a vertical position clears the underlying surface slightly so that the frame structure may readily be brought into a vertical position in contact with the sides of the pair or set of three cylinders. The appropriate hook elements are then manipulated to place the inturned hook 13 under the reinforcing flange 17 as shown in FIG. 3. The frame is then tilted slightly until the hook 13 and reinforcing flange 17 are in mutual engagement as shown in FIG. 4. On further tilting of the frame structure about the axis of the wheels, the compressed gas cylinders are suspended each from a corresponding hook and are ready for transportation.

It will be noted that in most cases no premanipulation of the compressed gas cylinder is required. The hook elements enable the operator to keep his hands free of the cylinders.

In the ordinary handling of the carrier, the compressed gas cylinders rest against the frame structure and readily remain in place. However, to insure against lateral swinging of the compressed gas cylinders under careless handling of the carrier, the frame may be provided near its lower end with lateral movement retainer lugs 18.

To facilitate operation of the hook elements, the handle arms may be joined by connectors 19 with a flexible link, the ends of which are fitted into retainer bosses 20 as shown in FIG. 6. The connector link may be formed of any flexible material or otherwise formed to allow a limited amount of relative movement of the hooks 13.

Tests with the embodiment shown in FIGS. 1 through 7 have demonstrated that a time saving in excess of 50% in the handling of cylinders is accomplished as compared to conventional means. Also, the safety factor is materially increased.

Referring to FIGS. 8, 9 and 10, in this embodiment the frame structure and its wheels may be essentially the same as the first embodiment. If the carrier is intended to handle only one size of compressed gas cylinders, a pair of single hook elements 21 may be used which are welded to the top cross bar 3. If two sizes of compressed gas cylinders are to be carried, a set of three dual hook elements 22 may be provided as indicated in FIG. 11.

This construction is particularly adapted for compressed gas cylinders which utilize a valve protector disclosed in U.S. Pat. No. 3,776,412, and herein designated 23. The valve guard 23 includes a screwheaded base 24 joined to upwardly diverging side walls 25 having a pair of opposed access openings 26. At least one of the openings terminates below the upper end of the valve protector so as to provide a cross portion 27 accessible to the hook elements through the corresponding opening.

Operation of this embodiment is as follows:

As in the first embodiment, the frame structure may be wheeled up to the compressed gas cylinder as shown in FIG. 8. The frame structure when in a vertical position clears the underlying surface a sufficient amount that the upper end of the frame structure may be tilted forwardly so as to guide the hook elements 21 or 22 into an access opening 26 and under the corresponding cross portion 27 whereupon the upper portion of the frame structure is tilted backwardly causing the compressed gas cylinder to be suspended from a corresponding hook element 21 or 22. Once this is accomplished, the compressed gas cylinder is ready for transportation while in a suspended condition.

If desired, a retainer loop 28 may be provided; its main function being to limit tilting of the cylinders away from the carrier before engagement with the hooks or to prevent the cylinders from tipping forwardly when the carrier hooks are disengaged.

I claim:

1. A carrier for compressed gas cylinders of the type having a valve at its upper end and a cylindrical valve protector extending upwardly around the valve and terminating in an annular internal downwardly directed hook flange, said carrier comprising:
   a. an essentially flat frame structure having a front side, a back side, a lower portion and an upper portion;
   b. a pair of wheels having a common axis of rotation;
   c. a wheel supporting structure for securing the wheels at the back side of the frame structure in tangent relation to a plane essentially perpendicular to the lower end of the frame structure whereby the frame structure may be moved while in an inclined position into point contact with the gas cylinder then tilted to a vertical position placing the upper and lower portions of the frame structure in side contact with the gas cylinder while the gas cylinder rests freely on an underlying surface;
   d. and pivotally mounted hook means at the upper portion of the frame structure movable between a position clearing and a position underlying the gas cylinder hook flange of the valve protector, whereby upon subsequently tilting the frame structure about the axis of the wheels, the gas cylinder becomes suspended by the hook means and remains in side contact with the frame structure.

2. A carrier, as defined in claim 1, wherein:
   a. the width of the frame structure is at least double the diameter of the gas cylinder whereby at least a pair of gas cylinders may be suspended by corresponding hook means for transportation.

3. A carrier, as defined in claim 2, wherein:
   a. connecting means extends between the hook means for moving the hook means in unison, the connecting means being yieldable to permit independent engagement of the hook means with the hook flanges of their respective valve protector.

4. A carrier, as defined in claim 1, wherein:
   a. the frame structure is provided with hook means disposed at different distances from the lower extremity thereof to accomodate gas cylinders of different lengths.

* * * * *